(No Model.)
3 Sheets—Sheet 1.
H. A. HICKOK.
CENTRO-LINEAD.
No. 430,647.
Patented June 24, 1890.
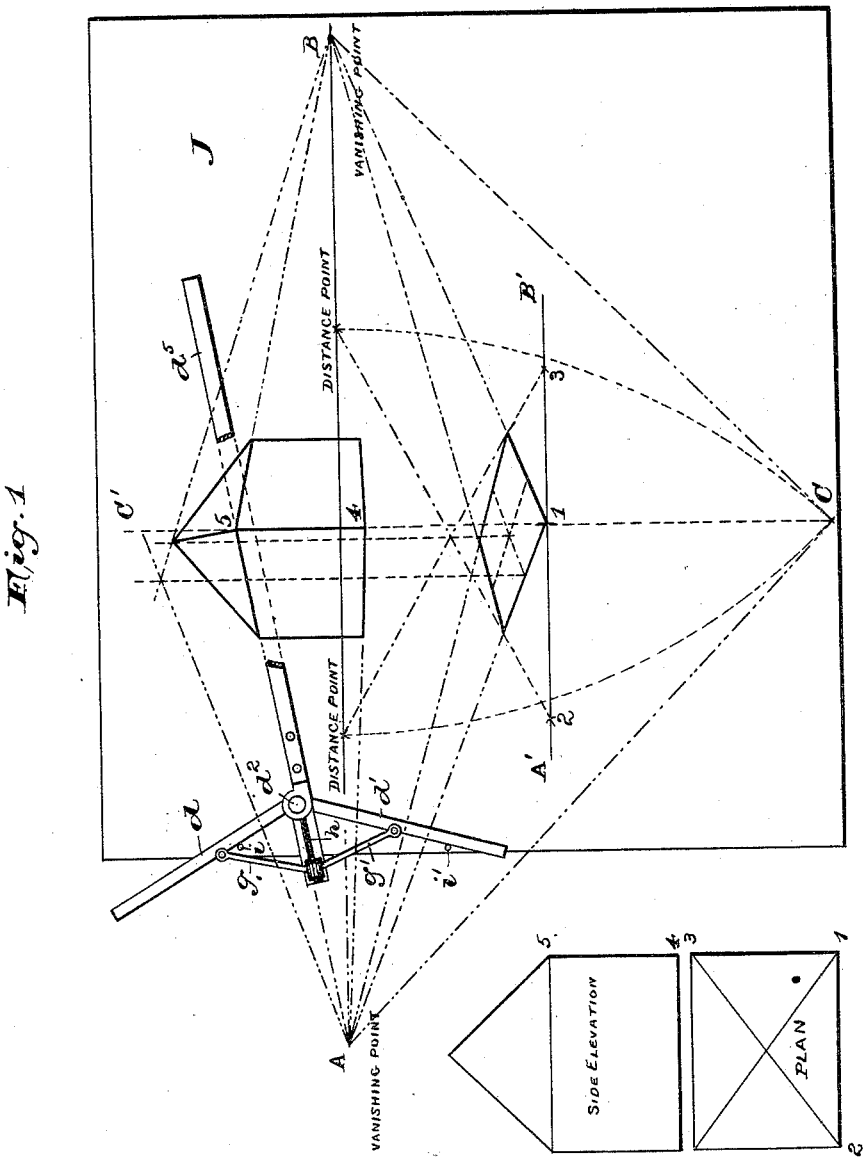
WITNESSES:
INVENTOR:
Henry Addison Hickok.
BY Fred. C. Fraentzel, ATTY.

(No Model.) 3 Sheets—Sheet 2.
H. A. HICKOK.
CENTRO-LINEAD.
No. 430,647. Patented June 24, 1890.
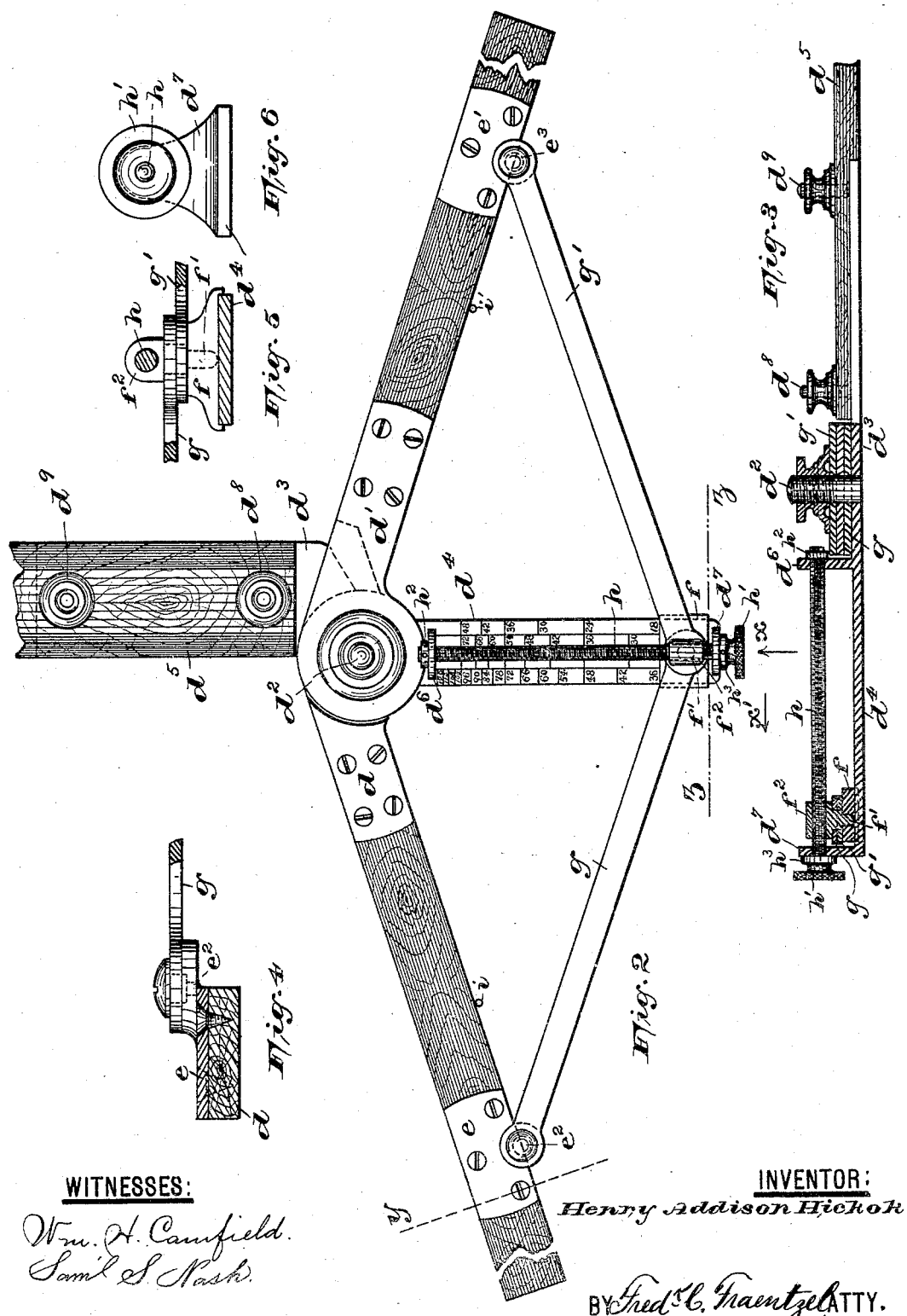
WITNESSES:
Wm. H. Canfield.
Sam'l S. Nash.
INVENTOR:
Henry Addison Hickok.
BY Fred'k C. Fraentzel ATTY.

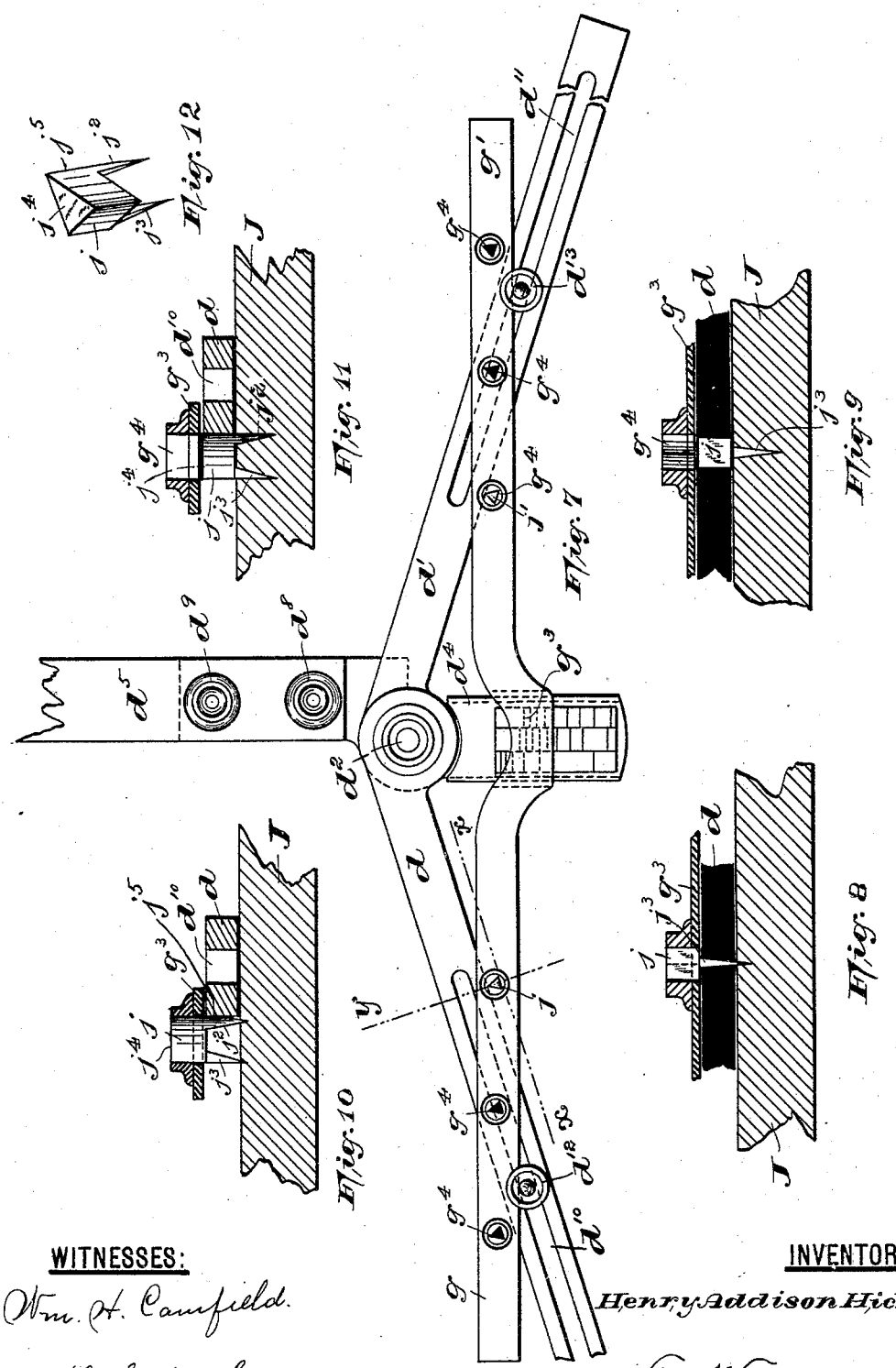

UNITED STATES PATENT OFFICE.

HENRY ADDISON HICKOK, OF NEWARK, NEW JERSEY.

CENTRO-LINEAD.

SPECIFICATION forming part of Letters Patent No. 430,647, dated June 24, 1890.

Application filed December 6, 1889. Serial No. 332,859. (No model.)

*To all whom it may concern:*

Be it known that I, HENRY ADDISON HICKOK, a citizen of the United States, residing at Newark, in the county of Essex and State of New Jersey, have invented certain new and useful Improvements in Centro-Lineads; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

To avoid the annoyance caused by the want of a suitable device for drawing perspective views, and to provide a centro-linead or perspective linead, by means of which an accurate representation may be made of the details of the form and principal line of a body for the purposes of mechanical or architectural constructions, is the principal object of this invention.

To this end the invention consists in certain arrangements and combinations of parts whereby a drawing-instrument is secured for drawing lines which will, if sufficiently prolonged, converge to a given center, and whereby a centro-linead is provided by means of which these lines may be accurately drawn.

In the drawings herewith accompanying, in which various forms of constructions of the invention are illustrated, Figure 1 represents a diagrammatic view of a perspective plan of an object and a linear perspective of the same, the plane of the picture being represented upon the drawing-board, said view illustrating more especially the manner of the application of my centro-linead in making perspective views when one or both of the vanishing-points fall outside of the drawing-board or the drawing-paper thereon. On Sheet 2, Fig. 2 is a plan view of the centro-linead, and Fig. 3 is a vertical section through the line $x$ in Fig. 2. Fig. 4 represents a cross-section through line $y$ in Fig. 2, and Fig. 5 is a similar view through line $z$ in said Fig. 2. Fig. 6 is an end view of a manipulating-screw by means of which the instrument is adjusted. On Sheet 3, Fig. 7 represents a modified form of construction of the centro-linead in plan. Figs. 8 and 9 are sectional views of the same, taken through line $x$ in Fig. 7, illustrating the different positions of a pin or tack used in connection with the instrument; and Figs. 10 and 11 are similar views taken through the line $y$ in Fig. 7. Fig. 12 is a perspective view of the pin or tack employed with the instrument.

In the above-described views similar reference-letters are employed to indicate corresponding parts in each of said views.

In problems of descriptive geometry and in making perspective drawings, both mechanical and architectural, the plane of the picture is usually taken between the object to be represented and the point of sight, in order that the drawing may be of smaller dimensions than the object.

In the present case in Fig. 1, Sheet 1, a drawing-board is represented in outline, and upon the same the point of sight has been selected at C. A' B' represent the horizontal trace of the plane of the picture, and 1 on said line is the perspective point of the point 1 on the small plan of the object. (Shown to the left on said sheet.) C C' is the vertical axis, and upon the same the point 4 represents the point 4 shown in the small elevation of the object, also shown to the left on said sheet. A and B are the vanishing-points, which are found mathematically, and which in the present case are shown, as A, being off the drawing-board, and the other B being upon the same. Having the point of sight given and having found the vanishing-points, the distances from said vanishing-points to the vertical axis on the horizontal line connecting said vanishing-points are then known, and the instrument is adjusted accordingly, as will be described hereinafter, and can then be used in making the drawing.

I will now proceed to the description of the construction of the centro-linead. In the figures of the drawings shown on Sheet 2, $d$ $d'$ represent two arms or straight-edges, which are pivotally attached to each other at their ends by means of a pin and thumb-nut $d^2$, so that the vertical planes passing along the inner edges of said arms $d$ and $d'$ intersect in the central axis of said pin $d^2$. Arranged on the same pin and nut $d^2$ are two oppositely-projecting arms or plates $d^3$ and $d^4$, one of which, as $d^3$, has secured thereto, by means of thumb-nuts $d^8$ and $d^9$, or in any other wellknown manner, a linead or rule $d^5$, so adjusted that the vertical plane passing along the ruling-edge will also pass through the axis of the aforesaid pin $d^2$. The other arm or plate $d^4$ is provided with one or more graduated scales thereon. To the arms or straight-edges $d$ and $d'$ at any convenient points thereon are secured, by means of screws or pins, the plates $e$ and $e'$, having arranged thereon upwardly-extending posts or pins $e^2$ and $e^3$, the vertical axes of which lie in the same vertical plane as the inner edges of the arms or straight-edges $d$ and $d'$. A slide $f$ is arranged upon the arm $d^4$, adapted to freely move thereon, and which receives a pin or post $f'$, which in turn carries the nut or traveler $f^2$, the vertical axis of the pin or post $f'$ being in the same vertical plane as that passing along the ruling-edge of the linead or rule $d^5$ and through the pin $d^2$. Arranged upon said pins $e^2$, $e^3$, and $f'$ are the arms or links $g$ and $g'$, and upon the plate or arms $d^4$ are the lugs or bearings $d^6$ and $d^7$, which are perforated and carry a threaded rod or screw $h$, which rotates freely in said perforations. The traveler $f^2$ is perforated, and the perforation is provided with a thread which fits the thread of the screw or threaded rod $h$, and thus causes the sliding movement of the slide $f$ along the arm $d^4$ and over the scales thereon when the rod $h$ is turned by means of the thumb-nut or finger-piece $h'$. Collars $h^2$ and $h^3$ are secured to the rod $h$ to hold the same in its bearings $d^6$ and $d^7$, and also to take up any lost motion. Thus, when the rod $h$ is turned by means of the thumb-nut or finger-piece $h'$ the traveler $f^2$ moves, carrying with it the slide $f$ to the proper place on the scale, and this movement is transmitted to the arms $d$ and $d'$ by means of the links or arms $g$ and $g'$, and varies the angle between the arms $d$ and $d'$ accordingly.

In applying the instrument to use two pins $i$ and $i'$ are arranged in the drawing-board, as will be hereinafter described. When the arms $d$ and $d'$ have been properly adjusted by means of the adjusting-screw $h$ and the scale on the arm $d^4$ and the inner edges of the said arms $d$ and $d'$ are placed in contact with the pins $i$ and $i'$, any line drawn along the ruling-edge of the linead $d^5$, if prolonged, will pass through the center of a circle of which the distance between the pins $i$ and $i'$ is a chord, which center is perpendicularly removed from said chord joining the pins $i$ and $i'$ by a distance which corresponds to the figure on the scale on the arm $d^4$, to which the slide has been set. Thus, when the centro-linead is rotated, the inner edges of the arms $d$ and $d'$ being kept in constant contact with the pins $i$ and $i'$, all lines drawn with the linead $d^5$ and prolonged will pass through the same center as above described.

The operation of the device is as follows: Suppose that by calculation it has been found that the vanishing-point A on the line A B, Fig. 1, is at a distance of sixty inches from the line C C', the draftsman, according to circumstances, may use any one of the scales on the arm $d^4$. If he selects the scale to the right of the arm, Fig. 2, and sets his slide to the graduation-mark 18, he must place the pins $i$ and $i'$ in a line perpendicular to the line A B, said line being at such a distance from the point 4 in Fig. 1 that said distance will be equal to sixty minus eighteen, or forty-two inches from the point 4, the distance between the said pins $i$ and $i'$ being twelve inches, equally divided on the line A B; then all lines drawn with the linead $d^5$, if prolonged, will pass through a common center, which is the vanishing-point A, and the length of a perpendicular drawn from the line connecting the pins $i$ and $i'$ to the center or vanishing-point will, if measured in inches, correspond to the number on the scale to which the instrument has been adjusted.

It will be seen from Fig. 2 that three scales are shown on the arm $d^4$. For the scale to the right, as has been stated, the distance between the pins $i$ and $i'$ is twelve inches. If the middle scale is used, the pins $i$ and $i'$ are to be placed eighteen inches apart, and when the left-hand scale is used said pins must be placed twenty-four inches apart.

So far as the theory of the instrument is concerned, it is evident that only one scale and one position for the pins $i$ and $i'$ are really necessary to correspond to any position of the vanishing-point. Practically, however, if but one scale is used, the pins $i$ and $i'$ being near together and the vanishing-point remote, the slide $f$ would come too close to the pin $d^2$, and thus interfere with the working of the main joint of the instrument, and, too, the divisions on the scale corresponding to the remote positions of the vanishing-point would be too close together for convenience in setting; also, if but one scale and one position for the pins $i$ and $i'$ were used and the vanishing-point taken a short distance away the length of the arm $d^4$ would be so great as to be inconvenient. These objections have been met by using three positions for the pins $i$ and $i'$, to which the graduations on the scales correspond, thus making the arm $d^4$ convenient in length and the divisions on the scales far enough apart to secure clearness and at the same time sufficient variation in the vanishing-point. Of course it will be understood that the pins $i$ and $i'$ may theoretically be placed any distance apart if the scales are graduated accordingly; but the scales shown in the drawings are all that are necessary for the ordinary requirements of the draftsman.

From the above it will be seen that the operation of the device is very simple, and does not require great skill in manipulating.

It is my intention to supply, in connection with the centro-linead, a label upon which the directions for use are printed, and by means of which the draftsman can readily adjust the instrument and arrange the pins $i$ and $i'$ in the drawing-board. Any strong round pin of very small diameter may be used in connection with the centro-linead shown in Fig. 2.

On Sheet 3 is illustrated a modified form of construction of my centro-lined, which is used in a like manner against triangular pins $j$ and $j'$ as that described in the above, but in which I have dispensed with the use of the adjusting-screw $h$ and the links $g$ and $g'$. In said construction the arms $d$ and $d'$ are provided with longitudinal slots $d^{10}$ and $d^{11}$, and instead of the links $g$ and $g'$ shown in the construction illustrated in Fig. 2 a bar $g^3$ is used which slides upon the graduated arm or plate $d^4$ in guides, as will be seen from said Fig. 7. Said bar $g^3$ is provided with a series of conveniently-spaced triangular holes $g^4$, in which fit and may be forced therethrough triangular pins $j$ and $j'$. The operation of this form of centro-linead is as follows: When the vanishing-point has been found and the scale and graduation on the arm $d^4$ determined upon—as, for instance, the right-hand scale—the reading-edge of the bar $g^3$ is placed upon said graduation and scale. The pins $j$ and $j'$ are now inserted in the perforations, as shown in Figs. 7, 8, and 10, which in this case—that is, for the right-hand scale—are twelve inches apart, and the arms $d$ and $d'$ are brought against the pins and screwed or clamped fast by means of thumb-nuts $d^{12}$ and $d^{13}$, arranged in the slots $d^{10}$ and $d^{11}$, and the several parts of the centro-linead are thereby rigidly held together, the reading-edge of the bar $g^3$ being still in its original position. When the bar $g^3$ and the arms $d$ and $d'$ have been securely fastened to each other by said thumb-nuts, the pins $j$ and $j'$ are forced through the perforations in the bar $g^3$ and firmly driven home, in the drawing-board J, being held in place therein by means of the pins or points $j^2$ and $j^3$, so that the upper surface $j^4$ of the triangular pins is below the lower surface of the bar $g^3$, as is clearly illustrated in Figs. 9 and 11. The inner edges of the arms $d$ and $d'$ are thus left free to rotate or move against the sharp edge $j^5$ of the pin $j$, and the instrument is then used in the same manner as has been described.

I am aware of the fact that numerous other means may be employed for adjusting the arms $d$ and $d'$ without departing from the scope of my invention; but I prefer the construction illustrated in Sheet 2 of the drawings, as this instrument may be easily manipulated and adjusted, and at the same time the appearance thereof is more sightly. A further advantage of said construction is that the parts are rigidly held in position and still are free to move by means of the adjusting-screw $h$. By this arrangement and construction, no matter how far the vanishing-point is taken from the vertical axis, (within the limits of the scale,) however small the paper and board upon which the perspective view is to be produced, this advantage is gained, that all lines drawn with my centro-linead will, if prolonged, intersect in the vanishing-point, whether said vanishing-point is accessible or not, and a perspective view is the result, all the lines of which are correctly drawn.

Having thus described my invention, what I claim is—

1. A centro-linead consisting of a linead or rule having straight-edges pivotally attached thereto, so that the vertical planes passing along their inner edges intersect in the central axis of their common pivotal pin, and arms or links co-operating with said straight-edges, whereby the parts of the instrument are brought into their proper and true relative positions for use, so that the angle formed between said straight-edges is definitely fixed in relation to the vanishing-point, and means connected with and joining said arms, as set forth.

2. In a centro-linead, the combination, with a linead or rule, of straight-edges pivotally attached thereto, so that the vertical planes passing along their inner edges intersect in the central axis of their common pivotal pin, and arms or links secured to and co-operating with said straight-edges, whereby the parts of the centro-linead are automatically brought into their proper and true relative positions for use, and means connected with and joining said arms, substantially as and for the purposes set forth.

3. In a centro-linead, the combination, with a linead or rule, of straight-edges pivotally attached to said linead or rule, so that the vertical planes passing along the ruling-edge of the linead and the inner edges of the straight-edges intersect in the central axis of their common pivotal pin, an arm or plate attached to said linead or rule, and arms or links connecting said plate with the straight-edges for adjusting the same, for the purposes set forth.

4. In a centro-linead, the combination, with a linead or rule, of straight-edges pivotally attached to said linead, so that the vertical planes passing along the ruling-edge of the linead and those passing along the inner edges of the straight-edges intersect in the central axis of their common pivotal pin, an arm or plate thereon provided with one or more graduated scales, a slide, and means for connecting said slide to the straight-edges, for the purposes set forth.

5. In a centro-linead, the combination, with a linead, of straight-edges pivotally attached thereto, so that the vertical planes passing along the ruling-edge of the linead and those passing along the inner edges of the straight-edges intersect in the central axis of their common pivotal pin, an arm or plate provided with graduations thereon, a slide provided with oppositely-projecting arms, and means for securing and connecting the said arms to the pivoted straight-edges, for the purposes set forth.

6. In a centro-linead, the combination, with a linead, of straight-edges pivotally attached thereto, so that the vertical planes passing along the ruling-edge of the linead and those passing along the inner edges of the straight-edges intersect in the central axis of their common pivotal pin, an arm or plate provided with graduations thereon, a slide having oppositely-projecting arms, means for securing the said arms to the straight-edges, and an adjusting-screw working in said slide and in bearings on the graduated plate, for the purposes set forth.

7. A centro-linead consisting of a linead or rule, straight-edges pivoted thereto, and an arm or plate provided with one or more scales thereon for adjusting said straight-edges, and links connecting said graduated plate with said straight-edges and being secured to the latter by means of pins or posts, the vertical axes of which lie in the same vertical plane passing along the inner edges of said straight-edges, as and for the purposes set forth.

8. In a centro-linead, the combination, with a linead or rule, of straight-edges pivotally attached thereto, so that the vertical planes passing along their inner edges intersect in the central axis of their common pivotal pin, and arms or links for adjusting said straight-edges and means connected with and joining said arms, so that all the parts of the centro-linead are brought simultaneously into their proper and true relative positions and that the angle made by one of the straight-edges with the rule will be exactly equal to the angle made by the other straight-edge with said rule, as and for the purposes set forth.

9. In a centro-linead, the combination, with a linead, of straight-edges pivotally attached thereto, an arm or plate provided with graduations thereon, a slide having oppositely-projecting arms, means for securing said arms to the straight-edges, an adjusting-screw above said graduated plate working in bearings on said plate and a traveler thereon, and a finger-piece for rotating or turning said screw, as and for the purposes set forth.

10. In a centro-linead, the combination, with a linead or rule, of straight-edges pivotally attached to said linead, so that the vertical planes passing along the ruling-edge of the linead and the inner edges of the straight-edges intersect in the central axis of their common pivotal pin, an arm or plate intermediately arranged between said straight-edges, and an adjusting mechanism adapted to slide on said intermediately-arranged arm and connected with said straight-edges for adjusting the same, for the purposes set forth.

11. In combination with a pair of pins adapted to be driven into a drawing-board, a centro-linead consisting of a linead or rule having pivotally attached thereon two straight-edges in such a manner that the vertical planes passing along the ruling-edge of the linead and along the inner edges of the straight-edges intersect in the central axis of their common pivotal pin, and arms or links co-operating with said straight-edges, and means for connecting and joining said arms, whereby the same are brought into their true relative position for use, so that the angle formed between said straight-edges is definitely fixed in relation to its vanishing-point, substantially as and for the purposes set forth.

12. A centro-linead combining therein a linead or rule, straight-edges pivotally attached to said rule in such a manner that the vertical planes passing along their inner edges intersect in the central axis of their common pivotal pin, and a plate or arm provided with one or more scales, and means adapted to be set to any one of the graduations on said scale or scales and connected with the straight-edges for adjusting the same, for the purposes set forth.

In testimony that I claim the invention set forth above I have hereunto set my hand this 26th day of November, 1889.

HENRY ADDISON HICKOK.

Witnesses:
FREDK. C. FRAENTZEL,
WM. H. CANFIELD.